(12) United States Patent
Yasumura et al.

(10) Patent No.: US 7,858,696 B2
(45) Date of Patent: Dec. 28, 2010

(54) CONDUCTIVE RESIN COMPOSITION, PROCESS FOR PRODUCTION THEREOF, AND FUEL CELL SEPARATORS

(75) Inventors: Takashi Yasumura, Osaka (JP); Toshiya Kato, Osaka (JP); Kenichi Hamada, Osaka (JP); Tetsuya Harada, Osaka (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 10/532,084

(22) PCT Filed: Mar. 5, 2004

(86) PCT No.: PCT/JP2004/002843

§ 371 (c)(1),
(2), (4) Date: Apr. 21, 2005

(87) PCT Pub. No.: WO2004/081071

PCT Pub. Date: Sep. 23, 2004

(65) Prior Publication Data

US 2006/0060824 A1 Mar. 23, 2006

(30) Foreign Application Priority Data

Mar. 10, 2003 (JP) ............................. 2003-063192

(51) Int. Cl.
*H01M 8/02* (2006.01)
*H01M 8/00* (2006.01)
*H01B 1/12* (2006.01)
*H01B 1/20* (2006.01)

(52) U.S. Cl. ...................... 524/556; 524/495; 429/129; 252/511; 252/512; 252/513

(58) Field of Classification Search ................ 524/556, 524/495; 429/34, 129; 252/500, 511, 512, 252/513; 264/104, 105, 115, 117, 125, 122, 264/241

See application file for complete search history.

(56) References Cited

U.S. PATENT DOCUMENTS

| | | | | |
|---|---|---|---|---|
| 4,205,018 A | * | 5/1980 | Nagasawa et al. | 525/404 |
| 4,548,689 A | * | 10/1985 | Sakashita et al. | 522/30 |
| 4,618,658 A | * | 10/1986 | Hefner et al. | 525/454 |
| 5,886,082 A | * | 3/1999 | Numa et al. | 524/501 |
| 6,054,536 A | * | 4/2000 | Brown et al. | 525/107 |
| 6,251,308 B1 | * | 6/2001 | Butler | 252/511 |
| 6,306,995 B1 | * | 10/2001 | Wang | 526/348 |
| 6,429,236 B1 | * | 8/2002 | Carlson et al. | 523/146 |
| 6,441,060 B1 | * | 8/2002 | Hendershot et al. | 523/142 |
| 6,613,849 B2 | * | 9/2003 | Walker et al. | 525/531 |
| 6,764,624 B2 | * | 7/2004 | Saito et al. | 264/115 |
| 7,132,460 B2 | * | 11/2006 | Fujimoto et al. | 522/14 |
| 7,268,172 B2 | * | 9/2007 | Bach et al. | 522/92 |
| 2001/0049046 A1 | | 12/2001 | Butler | |
| 2002/0005508 A1 | | 1/2002 | Butler et al. | |
| 2002/0055030 A1 | * | 5/2002 | Okumura et al. | 429/34 |
| 2002/0086198 A1 | | 7/2002 | Iino et al. | |
| 2002/0132118 A1 | * | 9/2002 | Hirai et al. | 428/375 |
| 2002/0182473 A1 | | 12/2002 | Blunk et al. | |
| 2003/0013798 A1 | | 1/2003 | Iino et al. | |
| 2003/0042468 A1 | | 3/2003 | Butler | |

FOREIGN PATENT DOCUMENTS

| | | | |
|---|---|---|---|
| EP | 1 189 297 A2 | | 3/2002 |
| JP | 59-71322 | | 4/1984 |
| JP | 61-009424 | * | 1/1986 |
| JP | 61-009424 A | * | 1/1986 |
| JP | 61-009424 A | * | 1/1986 |
| JP | 03-199230 | * | 8/1991 |
| JP | 7-252349 | | 10/1995 |
| JP | 2000-351843 | * | 12/2000 |
| JP | 2001-64340 | | 3/2001 |
| JP | 2001-151833 | | 6/2001 |
| JP | 2001-520245 | | 10/2001 |
| JP | 2002-60639 | | 2/2002 |
| JP | 2002-164063 | | 6/2002 |
| JP | 2003-22816 | | 1/2003 |
| JP | 2003-524862 | | 8/2003 |
| WO | 99/19389 A1 | | 4/1999 |

* cited by examiner

*Primary Examiner*—Duane Smith
*Assistant Examiner*—Ives Wu
(74) *Attorney, Agent, or Firm*—Edwards Angell Palmer & Dodge LLP

(57) ABSTRACT

An object of the present invention is to provide a conductive resin composition which does not cause problems with regard to moldability such as occurrence of separation between a resin component and a conductive filler, voids and warp on molding, and is excellent in filling of a resin into a mold, and is also capable of being used for various electrical and electronic materials, including a separator for a fuel cell having excellent properties. To achieve the above object, the present invention provides a conductive resin composition comprising a conductive filler (A); a urethane-modified epoxy (meth)acrylate (B) obtained by reacting an epoxy (meth)acrylate (b-1), which is obtained by the addition reaction of an epoxy resin having an aromatic cyclic structural unit and/or an aliphatic cyclic structural unit and a (meth)acrylic acid, with a polyisocyanate (b-2); a (meth)acrylate (C) having a number average molecular weight of 500 to 10,000, which contains 20 to 80% by weight of an aromatic cyclic structural unit and/or an aliphatic cyclic structural unit and contains no active hydrogen atom; and the other ethylenically unsaturated monomer (D) which is copolymerizable with the urethane-modified epoxy (meth)acrylate (B) and the (meth)acrylate (C).

15 Claims, No Drawings

CONDUCTIVE RESIN COMPOSITION, PROCESS FOR PRODUCTION THEREOF, AND FUEL CELL SEPARATORS

TECHNICAL FIELD

The present invention relates to a conductive resin composition which is useful as various electrical and electronic materials, industrial members, and cell members such as a separator for a fuel cell, to a method for producing the same, and to a separator for a fuel cell obtained by molding the conductive resin composition.

This application claims priority from Japanese Patent Application No. 2003-63192 filed on Mar. 10, 2003, the disclosure of which is incorporated by reference herein.

BACKGROUND ART

Molded articles of conductive resin compositions have recently been anticipated as materials to replace conventional metalwork products. In the electrical field, molded articles of conductive resin compositions have become of major interest as materials which are excellent in moldability and corrosion resistance and are also cheap. Examples of the material in the electrical field include resin compositions having high conductivity used as separator materials for a fuel cells, and various cell members.

The fuel cells are classified depending on the kinds of the electrolyte, the fuel and the oxidizing agent which are used ins portions of constituent members. The fuel cell includes, for example, a solid polymer type fuel cell comprising a solid polymer electrolyte membrane as an electrolyte, a hydrogen gas as a fuel, and air as an oxidizing agent; and a methanol direct type fuel cell wherein hydrogen is directly derived from methanol in the fuel cell and is used as the fuel. These fuel cells can perform efficient power generation at comparatively low operation temperature of 200° C. or lower on power generation.

A separator as one of constituent members of these fuel cells requires gas impermeability for stable feeding of a fuel and an oxidizing agent gas to electrodes in a separated state, and conductivity for enhancement of power generation efficiency, and also requires durability such as corrosion resistance under the operation environment, or hydrolysis resistance. In the production of the separator, excellent productivity and good moldability are required.

As materials for these separators for a fuel cell, for example, the use of molding materials made of carbon-based fillers and thermosetting resins, and molded articles has been studied.

It has been proposed to use, as the thermosetting resin, epoxy resin, phenol resin, and radical polymerizable resin.

Among these resins, a radical polymerizable resin is excellent in view of productivity on molding and various techniques using such a resin have been proposed. Japanese Unexamined Patent Application, First Publication No. 2001-151833 proposes, for example, a curable composition comprising a vinyl ester resin and a carbon-based filler. Also, Japanese Unexamined Patent Application, First Publication No. 2002-164063 proposes a resin composition comprising a radical polymerizable resin such as vinyl ester resin, and a carbon-based filler.

According to these techniques, the resulting separator is excellent in initial performances such as mechanical strength and conductivity, but is inferior in corrosion resistance, particularly durability such as hydrolysis resistance. Since an epoxy (meth)acrylate as a vinyl ester resin which is used in the technique disclosed in the document generally has a lot of hydroxyl groups in the molecule, structurally, the molded article made of the resin has high water absorption and the strength decreases due to water absorption. Furthermore, hydrolysis of the resin proceeds by water absorbed and the strength of the molded article decreases, and thus such an epoxy (meth)acrylate is not suited for practical use in a separator for a fuel cell.

Japanese Unexamined Patent Application, First Publication No. 2002-164063 discloses, as a method for thickening the vinyl ester resin on molding, a method of adding an polycarboxylic acid anhydride to a hydroxy group formed by reacting an epoxy group with a carboxyl group to form a carboxyl group and thickening using an oxide of metal such as magnesium or calcium as a thickener. However, this method causes problems such as deterioration of water resistance due to elution of metal and adverse influence on fuel cell properties, and thus the resulting fuel cell is not suited for practical use.

U.S. Pat. No. 6,251,308 proposes a curable resin composition comprising a vinyl ester resin, a carbon-based filler, and a polyisocyanate. The resulting separator made of this resin composition is excellent in mechanical strength and conductivity, and durability such as hydrolysis resistance is improved to some extent; however, water absorption of the resin and decrease in mechanical strength of the molded article due to hydrolysis may occur according to the composition of the resin such as unsaturated polyester, and thus there is yet room for improvement in durability, particularly hydrolysis resistance.

It is not necessarily easy to control moldability of the resin composition and in the case in which a molded article having a complicated shape such as a separator for a fuel cell is obtained by a compression molding method as a molding method disclosed in the document, the resin composition as the molding material may not be fully filled into the portion having a complicated shape of the mold, or warp may occur in the resulting molded article, and thus the resulting molded article does not have stable quality in view of moldability.

As described above, there has not yet been made a conductive resin composition which is excellent in filling into a mold having a complicated shape, and also ensures high-level mechanical strength, conductivity, gas impermeability, corrosion resistance, and durability such as hydrolysis resistance of the resulting molded article.

An object of the present invention is to provide a separator for a fuel cell which is excellent in dimensional accuracy, conductivity, heat resistance, and mechanical strength, and is also excellent in durability such as hydrolysis resistance.

Another object of the present invention is to provide a conductive resin composition which does not cause problems with regard to moldability such as occurrence of separation between a resin component and a conductive filler, voids and warp on molding, and is excellent in filling into a mold, and is also capable of being used to produce various electrical and electronic materials, including a separator for a fuel cell having excellent properties.

Another object of the present invention is to provide a method for producing the conductive resin composition.

DISCLOSURE OF THE INVENTION

The present inventors have intensively researched so as to achieve the above objects, and they found that when a hydroxyl group of an epoxy (meth)acrylate is reacted with a polyisocyanate thereby to modify the epoxy (meth)acrylate with urethane, a decrease in mechanical strength due to water absorption or hydrolysis is remarkably suppressed and thus durability of a molded article obtained from a resin composition containing the urethane-modified epoxy (meth)acrylate and a conductive filler as a main component can be improved.

In the industry, the epoxy (meth)acrylate is also referred to as a vinyl ester resin and both are often considered to have the same meaning.

As a molding method of producing a molded article requiring high dimensional accuracy, such as a separator for a fuel cell, using a radical polymerizable resin composition containing a conductive filler such as a carbon material of the present invention, a compression molding method disclosed in the above-mentioned U.S. Pat. No. 6,251,308 is effective. In the case in which the resin composition is molded by this molding method, it is necessary to convert the resin composition into a liquid state with comparatively high viscosity or a solid state so as to ensure good moldability. Otherwise, there arise problems such as separation of a resin component and a conductive filler contained in a resin composition during the compression molding, and non-uniform distribution of the conductive filler which exists in the resin composition in a substantially uniform state. In the case in which the resin composition does not have high viscosity on molding, the resulting molded article may include voids.

As described above, we confirmed that when the hydroxyl group of the epoxy (meth)acrylate is reacted with the polyisocyanate, thereby to modify the epoxy (meth)acrylate with urethane, it is possible to obtain the effect of thickening the resin composition and converting it into a state with no flowability at normal temperature, thereby avoiding the occurrence of problems on molding and to ensuring good moldability, in addition to the effect of improving the durability.

However, in the case in which the resin composition is thickened enough to suppress separation between the resin component and the conductive filler, there arise other problems that the resin composition may not be fully filled into the portion having a complicated shape of the mold, or warp may occur in the resulting molded article.

In the present invention, for the purpose of improving heat resistance and mechanical strength of the molded article, an epoxy (meth)acrylate obtained by the reaction of adding (meth)acrylic acid to an epoxy resin having an aromatic cyclic structural unit and/or an aliphatic cyclic structural unit is used. However, since the epoxy (meth)acrylate has high viscosity, a radical polymerizable compound having comparatively low molecular weight, such as (meth)acrylate or styrene is used as a diluent so as to improve handling properties on preparation of the resin composition and to uniformly disperse other components such as a conductive filler.

The present inventors have intensively researched by changing the kinds and amount of the diluent so as to solve problems such as filling of a resin into a mold and warp on molding. However, it was impossible to solve these problems while maintaining properties of the molded article.

As a result of further research, it has been found that the use of a (meth)acrylate having a number average molecular weight of 500 to 10,000, which contains an aromatic cyclic structural unit and/or an aliphatic cyclic structural unit and contains no active hydrogen atom makes it possible to suppress the occurrence of separation between the resin component and the conductive filler, and voids, to solve problems such as filling of the resin composition into the mold and warp on molding, and to obtain a molded article which is excellent in dimensional accuracy, conductivity, heat resistance and mechanical strength, and is also excellent in durability such as hydrolysis resistance. Thus the present invention has been completed.

The present invention provides a conductive resin composition comprising a conductive filler (A); a urethane-modified epoxy (meth)acrylate (B) obtained by reacting an epoxy (meth)acrylate (b-1), which is obtained by the addition reaction of an epoxy resin having an aromatic cyclic structural unit and/or an aliphatic cyclic structural unit and a (meth)acrylic acid, with a polyisocyanate (b-2); a (meth)acrylate (C) having a number average molecular weight of 500 to 10,000, which contains 20 to 80% by weight of an aromatic cyclic structural unit and/or an aliphatic cyclic structural unit and contains no active hydrogen atom; and the other ethylenically unsaturated monomer (D) which is copolymerizable with the urethane-modified epoxy (meth)acrylate (B) and the (meth)acrylate (C).

The present invention also provides a method for producing a conductive resin composition, which comprises (1) the first step of kneading a conductive filler (A), an epoxy (meth)acrylate (b-1) obtained by the addition reaction of an epoxy resin having an aromatic cyclic structural unit and/or an aliphatic cyclic structural unit and a (meth)acrylic acid, a polyisocyanate (b-2), a (meth)acrylate (C) having a number average molecular weight of 500 to 10,000, which contains 20 to 80% by weight of an aromatic cyclic structural unit and/or an aliphatic cyclic structural unit and contains no active hydrogen atom, and an ethylenically unsaturated monomer (D), and (2) the second step of reacting the kneaded mixture obtained in the first step with the (meth)acrylate (b-1) and the polyisocyanate (b-2) at a temperature of room temperature to 80° C., thereby to cause chain elongation.

The present invention also provides a separator for a fuel cell obtained by molding the conductive resin composition.

As used herein, (meth)acrylate means acrylate and methacrylate, and (meth)acrylic acid means acrylic acid and methacrylic acid.

The present invention will now be described in detail.

Examples of the conductive filler (A) used in the present invention, include but are not limited to, a carbon material, metal, a metal compound and conductive polymer powder. Among these conductive fillers, a carbon material is preferable in view of durability.

Examples of the carbon material include artificial graphite, natural graphite, glassy carbon, carbon black, acetylene black, ketjen black, and expanded graphite obtained by subjecting graphite to a chemical treatment. Among these carbon materials, artificial graphite, natural graphite and expanded graphite are preferable because high conductivity can be attained by the use of a small amount of the carbon material. These carbon materials may be in any form such as fibers, particles, foils, scales, needles, or spheres or be amorphous.

The fibrous carbon material among these carbon materials include, for example, pitch, PAN and rayon carbon fibers according to the kinds of a raw fiber. Among these, a carbon fiber produced through the carbonization and graphitization processes at high temperature of 2,000° C. or higher is preferable in view of conductivity. The length and form of the carbon fiber are not specifically limited, but a carbon fiber having a length of 25 mm or less is preferable in view of kneadability with the resin. Examples of the carbon fiber having the length within the above range include filaments, chopped strands and milled fibers.

Examples of the metal and metal compound include aluminum, zinc, iron, copper, nickel, silver, gold, stainless steel, palladium, titanium and boride thereof, boride of zirconium, and boride of hafnium. These metals and metal compounds may be in any form such as particles, fibers, or foils or be amorphous.

These conductive fillers can be used alone or in combination. As long as the effects of the present invention are not impaired, the above conductive material can be used in combination with a non-conductive material, and also a composite material of the conductive material and the non-conductive material can be used.

Examples of the composite material of the conductive material and the non-conductive material include metal-coated glass fiber, metal-coated glass beads and metal-coated inorganic filler.

The amount of the conductive filler (A) is preferably 50% by weight or more, and more preferably from 60 to 90% by weight, based on the total amount of the conductive resin composition of the present invention. When the amount of the conductive filler (A) is within the above range, the conductive resin composition has good flowability and excellent moldability, and thus excellent conductivity required for a separator for a fuel cell can be achieved.

The urethane-modified epoxy (meth)acrylate (B) used in the present invention is obtained by reacting an epoxy (meth)acrylate (b-1), which is obtained by the ring-opening addition reaction of an epoxy resin having an aromatic cyclic structure and/or an aliphatic cyclic structure and (meth)acrylic acid, with a polyisocyanate (b-2).

The epoxy (meth)acrylate (b-1) has a hydroxyl group based on the ring-opening addition reaction in the molecule and also has a functional group such as a (meth)acryloyl group at the end.

A number average molecular weight of the epoxy (meth)acrylate (b-1) is preferably from 500 to 10,000, and particularly preferably from 500 to 5,000. The number average molecular weight is preferably within a range from 500 to 10,000 in view of strength, water resistance and handling properties.

A hydroxyl value of the epoxy (meth)acrylate (b-1) is preferably from 100 to 300, and particularly preferably from 120 to 230. By adjusting the hydroxyl value within a range from 100 to 300, viscosity suited for molding is obtained by the chain elongation reaction with the polyisocyanate (b-2), thus making it possible to obtain a high-quality molded article with fewer defects such as voids.

Examples of the method of adjusting the hydroxyl value of the epoxy (meth)acrylate (b-1) within a range from 100 to 300 include a method of reacting two or more kinds of epoxy resins having a different epoxy equivalent with (meth)acrylic acid and a method of reacting an epoxy resin having a preferable epoxy equivalent with (meth)acrylic acid. Also, there may be listed a method of adding an isocyanate compound having reactivity with a hydroxyl group in the epoxy (meth)acrylate (b-1) after the ring-opening addition reaction, thereby reducing the hydroxyl value.

Examples of the epoxy resin having an aromatic cyclic structure and/or an aliphatic cyclic structure, which can be used as a raw material of the epoxy (meth)acrylate (b-1), include glycidyl ethers of multinucleate phenols such as bisphenol A type epoxy resin, biphenol type epoxy resin, phenol novolac type epoxy resin, cresol novolac type epoxy resin, and brominated epoxy resin; glycidyl ether of polyol, such as diglycidyl ether of alkylene oxide adduct of bisphenol A, or diglycidyl ether of hydrogenated bisphenol A; glycidyl esters such as hexahydrophthalic acid glycidyl ester; glycidylamines such as tetraglycidyldiaminodiphenylmethane; bisphenol fluorene type epoxy resin and biscresol fluorene type epoxy resin. These epoxy resins may be used alone or in combination.

Among these epoxy resins, a novolac type epoxy resin is preferable in view of heat resistance and water resistance. A dicyclopentadiene novolac type epoxy resin and a biphenyl novolac type epoxy resin are particularly preferable.

The dicyclopentadiene novolac type epoxy resin includes, for example, resin obtained by reacting dicyclopentadiene with phenols in the presence of an acid catalyst and mixing the product and an activated clay with stirring in an organic solvent (see Japanese Unexamined Patent Application, First Publication No. Hei 7-252349). The biphenyl novolac type epoxy resin includes, for example, a resin obtained by glycidyl etherification of a phenolic hydroxyl group of a 4,4'-biphenyldiylmethylene-phenol resin (see Japanese Unexamined Patent Application, First Publication No. 2001-64340).

The epoxy resin preferably contains 30 to 90% by weight, and particularly preferably 50 to 80% by weight of an aromatic cyclic structural unit and/or an aliphatic cyclic structural unit in the molecule. When the epoxy resin contains 30 to 90% by weight of an aromatic cyclic structural unit and/or an aliphatic cyclic structural unit, a molded article having low water absorptivity, high hardness and high durability can be obtained by using the resulting conductive resin composition.

Examples of the polyisocyanate (b-2), which can be used as the raw material of the urethane-modified epoxy (meth)acrylate (B), include 1,6-hexamethylene diisocyanate, trimethylhexamethylene diisocyanate, 4,4'-diphenylmethane diisocyanate, tolylene diisocyanate, xylylene diisocyanate, naphthalene diisocyanate, 1,4-cyclohexane diisocyanate, 4,4'-dicyclohexylmethane diisocyanate, isophorone diisocyanate, hydrogenated xylylene diisocyanate and norbornene diisocyanate. Also, isocyanurate compounds obtained by isocyanuration of various isocyanate compounds may be listed. These isocyanurate compounds are used alone or in combination.

The amount of the polyisocyanate (b-2) is preferably adjusted in terms of molar ratio of the mol number of a hydroxyl group of the epoxy (meth)acrylate (b-1) to the mol number of an isocyanate group of the polyisocyanate (b-2), (mol number of a hydroxyl group/mol number of an isocyanate group), within a range from 1.0/(0.5 to 1.5), and more preferably from 1.0/(0.8 to 1.2). When the amount of the polyisocyanate (b-2) is adjusted within the above range, moldability of the resulting conductive resin composition and physical properties of the molded article can be controlled.

The method for the addition reaction of the epoxy (meth)acrylate (b-1) and the polyisocyanate (b-2) includes, for example, a method of mixing both components using a kneader and reacting the mixture.

A number average molecular weight of the urethane-modified epoxy (meth)acrylate (B) used in the present invention is preferably within a range from 5,000 to 1,000,000, and particularly preferably from 10,000 to 200,000. When the number average molecular weight is within the above range, the resulting resin composition has good moldability.

As the (meth)acrylate (C) having a number average molecular weight of 500 to 10,000, which contains 20 to 80% by weight of an aromatic cyclic structural unit and/or an aliphatic cyclic structural unit and contains no active hydrogen atom, used in the present invention, for example, there can be used (meth)acrylate obtained by reacting a polyol having an aromatic cyclic structural unit and/or an aliphatic cyclic structural unit with (meth)acrylic acid, or urethane (meth)acrylate obtained by reacting a polyisocyanate having an aromatic cyclic structural unit and/or an aliphatic cyclic structural unit and a (meth)acrylate having a hydroxyl group and, if necessary, a polyol.

Examples of the polyol having an aromatic cyclic structural unit and/or an aliphatic cyclic structural unit, which can be used as the raw material of the (meth)acrylate, include polyesterpolyol, polyetherpolyol and polycarbonatepolyol, each having an aromatic cyclic structural unit and/or an aliphatic cyclic structural unit. These polyols can be used alone or in combination.

Among these polyols, polyetherpolyol is preferable in view of hydrolysis resistance and mechanical strength of the resulting molded article, and a cyclic compound adduct of a multinucleate phenolic compound, which is obtained by reacting a multinucleate phenolic compound with a cyclic compound described below such as alkylene oxide in the presence of a catalyst is more preferable, and an alkylene oxide adduct of a multinucleate phenolic compound is particularly preferable. Among alkylene oxide adducts of the multinucleate phenolic compound, an alkylene oxide adduct of a bisphenolic compound and an alkylene oxide adduct of a phenol novolac compound are particularly preferable. The mol number of these alkylene oxide adducts to be added is preferably 3 mol or less based on 1 mol of the phenolic hydroxyl group.

Examples of the cyclic compound include cyclic ether compounds such as ethylene oxide, propylene oxide, butylene oxide, oxetane or tetrahydrofuran; and cyclic carbonate compound such as ethylene carbonate or propylene carbonate, and the cyclic compound selected appropriately can be used.

Examples of the multinucleate phenolic compound include bisphenol compound such as bisphenol A, bisphenol S, bisphenol F, bisphenol E, bisphenol Z, tetramethyl bisphenol A, diallyl bisphenol A, 4-4'-oxybisphenol, biphenol, tetramethylbiphenol, bisphenolfluorene, biscresolfluorene or terpene diphenol; and novolac such as phenol novolac, cresol novolac, xylylene novolac, bisphenol A novolac, triphenylmethane novolac, biphenyl novolac, dicyclopentadienephenol novolac or terpenephenol novolac, and the multinucleate phenolic compound selected appropriately can be used.

Examples of the (meth)acrylate having a hydroxyl group, which is one of raw materials of the urethane (meth)acrylate used as the (meth)acrylate (C), include hydroxyethyl (meth)acrylate, hydroxypropyl (meth)acrylate, glycerin di(meth)acrylate and pentaerythritol tri(meth)acrylate. These (meth)acrylates can be used alone or in combination.

The polyisocyanate having an aromatic cyclic structural unit and/or an aliphatic cyclic structural unit used as the raw material of the urethane (meth)acrylate is a polyisocyanate having an aromatic cyclic structural unit and/or an aliphatic cyclic structural unit among those listed as the polyisocyanate (b-2) used as the raw material of the urethane-modified epoxy (meth)acrylate (B).

Also the urethane (meth)acrylate can be obtained by reacting a reaction product, which is obtained by reacting the polyol having an aromatic cyclic structural unit and/or an aliphatic cyclic structural unit listed as those which can be used as the raw material of the polyisocyanate and (meth)acrylate, each having an aromatic cyclic structural unit and/or an aliphatic cyclic structural unit, under the conditions that an isocyanate group of the polyisocyanate is in excess of a hydroxyl group of the polyol, with the (meth)acrylate having a hydroxyl group.

The (meth)acrylate (C) constituting the present invention exerts the effect of imparting plasticity to the urethane-modified epoxy (meth)acrylate (B) wherein the epoxy (meth)acrylate (b-1) is reacted with the polyisocyanate (b-2) thereby causing chain elongation, and improving filling of a resin composition into a mold while suppressing the occurrence of separation between a resin component and a conductive filler, which constitute the conductive resin composition of the present invention, and thus reducing warp of the molded article.

The (meth)acrylate (C) used in the present invention contains no active hydrogen atom, but can be used in combination of a (meth)acrylate having a hydroxyl value of 40 or less as long as plasticity can be imparted to the urethane-modified epoxy (meth)acrylate (B).

As used herein, "contains no active hydrogen atom" means that it does not contain a functional group having an active hydrogen atom, such as hydroxyl group, amino group, carboxyl group or mercapto group.

A number average molecular weight of the (meth)acrylate (C) is preferably from 500 to 10,000, and particularly preferably from 500 to 5,000, in view of balance between viscosity of the urethane-modified epoxy (meth)acrylate (B) and the plasticization effect.

The (meth)acrylate (C) used in the present invention contains 20 to 80% by weight, and preferably 30 to 60% by weight, of an aromatic cyclic structural unit and/or an aliphatic cyclic structural unit derived from the polyol.

When using the (meth)acrylate (C) containing an aromatic cyclic structural unit and/or an aliphatic cyclic structural unit in the amount within the above range, low water absorptivity, high hardness and durability can be achieved.

The other ethylenically unsaturated monomer (D), which is copolymerizable with the urethane-modified epoxy (meth)acrylate (B) and the (meth)acrylate (C) used in the present invention, is not specifically limited as long as it is a monomer which is copolymerizable with the epoxy (meth)acrylate (B).

The ethylenically unsaturated monomer (D) has a number average molecular weight of less than 500 other than the urethane-modified epoxy (meth)acrylate (B) and the (meth)acrylate (C), and is used as a diluent of the urethane-modified epoxy (meth)acrylate (B) and the (meth)acrylate (C).

When the urethane-modified epoxy (meth)acrylate (B) and the (meth)acrylate (C) are diluted with the ethylenically unsaturated monomer (D), it is possible to enhance handling properties of the conductive resin composition and to improve water resistance of the molded article.

Examples of the ethylenically unsaturated monomer (D) include aromatic vinyl monomer, (meth)acrylate, diallyl phthalate ester, carboxylic acid vinyl ester, vinyl ether, and maleimide compound. Among these ethylenically unsaturated monomers, an aromatic vinyl monomer is preferable so as to obtain a separator for a fuel cell which is required to have low water absorptivity and high heat resistance.

Examples of the aromatic vinyl monomer include styrene, t-butylstyrene, vinylnaphthalene, vinylbiphenyl, pentafluorostyrene, vinylpyrene, vinylthiophene, and vinylcarbazole. To improve water resistance and heat resistance, these aromatic vinyl monomers are preferably used in combination with a divinyl monomer such as divinylbenzene, divinylnaphthalene or divinylbiphenyl. For the purpose of improving various performances, the other monomer can be used in combination unless moldability, water absorptivity, and heat resistance are deteriorated.

A mixing ratio of the urethane-modified epoxy (meth)acrylate (B) and the (meth)acrylate (C) used in the present invention varies depending on the kinds of the epoxy (meth)acrylate (B) and the (meth)acrylate (C), and a weight ratio (B)/(C) is preferably within a range from 95/5 to 50/50, and particularly preferably from 90/10 to 70/30. When the weight ratio (B)/(C) is within the above range, the conductive resin composition of the present invention has proper moldability and a cured article and a molded article each having excellent performances such as mechanical strength and heat resistance can be obtained.

A mixing ratio of the urethane-modified epoxy (meth) acrylate (B), the (meth)acrylate (C), and the ethylenically unsaturated monomer (D) used in the present invention, [(B)+(C)]/(D), is preferably within a range from 80/20 to 50/50 in terms of a weight ratio in view of balance between moldability of the molding material, flowability on molding and water resistance.

More specifically, in the conductive resin composition of the present invention, the content of the conductive filler (A) is preferably from 50 to 90% by weight, the content of the urethane-modified epoxy (meth)acrylate (B) is preferably from 6 to 18% by weight, the content of the (meth)acrylate (C) is preferably from 2 to 8% by weight, and the content of the other ethylenically unsaturated monomer (D) is preferably from 2 to 25% by weight.

If necessary, the conductive resin composition of the present invention may further contain low profile additives, radical polymerization initiators, polymerization inhibitors, internal mold release agents, compatibilizing-agents, fillers and colorants.

Examples of the low profile additive include thermoplastic resin. Examples of the thermoplastic resin include polystyrene resins such as polystyrene, copolymer of styrene and (meth)acrylate ester, styrene-conjugated diene block copolymer and styrene-hydrogenated conjugated diene block copolymer; (meth)acrylate ester polymers containing no styrene, such as methyl polymethacrylate and n-butylpolyacrylate; polyvinyl chloride resins; polyethylene resins; polyphenylene ether resins; and polyvinylcarbazole. Among these thermoplastic resins, polystyrene resins and polyphenylene ether resins are preferable in view of water resistance.

To improve toughness and impact resistance, a mixture obtained by adding a rubbery resin to the thermoplastic resin can be used. Examples of the rubbery resin include acrylonitrile-butadiene resin and fine crosslinkable rubber particles.

These thermoplastic resins can be used alone or in combination. The amount of the thermoplastic resin is preferably from 0.1 to 5% by weight in view of the low profile effect.

Radical polymerization initiators are preferably added to the conductive resin composition. Examples of the radical polymerization initiator include heat polymerization initiators, ultraviolet polymerization initiators and electron beam polymerization initiators. The amount of the radical polymerization initiator is preferably from 0.1 to 10 parts by weight, and particularly preferably from 1 to 5 parts by weight, based on 100 parts by weight of the resin composition.

Examples of the heat polymerization initiator include organic peroxides such as diacyl peroxide, peroxy ester, hydroperoxide, ketone peroxide, alkyl perester and percarbonate compounds. Among these compounds, preferable compounds are appropriately selected according to molding conditions.

Examples of the ultraviolet polymerization initiator include photosensitizing substances such as acylphosphine oxide, benzoin ether, benzophenone, acetophenone and thioxanthone compounds. Preferable substances selected appropriately according to molding conditions can be used. Examples of the electron beam polymerization initiator include halogenated alkylbenzene and disulfide compounds.

To accelerate curing, radical polymerization accelerators, that is, curing accelerators can be used in combination with the radical polymerization initiator. Examples of the curing accelerator include metal salts such as cobalt naphthenate and cobalt octenoate; and tertiary amines such as N,N-dimethylaniline, N,N-di(hydroxyethyl)paratoluidine and dimethylacetamide and, if necessary, curing accelerators can be appropriately selected and used.

As the polymerization inhibitor, conventionally known polymerization inhibitors can be used. Specific examples thereof include hydroquinone, p-t-butylcatechol, t-butylhydroquinone, toluhydroquinone, p-benzoquinone, naphthoquinone, hydroquinone monomethyl ether, phenothiazine, copper naphthenate and copper chloride. These polymerization inhibitors may be used alone or in combination.

Examples of the internal mold release agent include paraffinic compounds such as carnauba wax, higher fatty acids such as stearic acid, higher fatty acid salt such as zinc stearate, fatty acid ester compound, alkyl phosphate ester, modified silicone oil and modified fluorine compound. Preferable compounds selected appropriately according to molding conditions and various uses can be used.

The above-mentioned compatibilizing-agent exerts the effect of preventing separation with time due to the addition of the low profile additive such as polystyrene to the conductive resin composition of the present invention and finely dispersing the low profile additive. As the compatibilizing-agent, various commercially available additives and compounds can be used.

As another filler other than the conductive filler, inorganic fillers and powdery organic fillers can be used. Examples thereof include inorganic fillers such as glass powder, silica and silicon carbide; and organic fillers such as polytetrafluoroethylene powder and melamine resin powder. These fillers selected appropriately according to molding conditions and various uses can be used.

As the colorant, various inorganic pigments and organic pigments can be used. Examples thereof include inorganic pigments such as titanium white and carbon black; and organic pigments such as phthalocyanine blue, quinacridon red and perylene.

The conductive resin composition of the present invention can be obtained by sequentially carrying out (1) the first step of kneading a conductive filler (A), an epoxy (meth)acrylate (b-1) obtained by the addition reaction of an epoxy resin having an aromatic cyclic structural unit and/or an aliphatic cyclic structural unit and a (meth)acrylic acid, a polyisocyanate (b-2), a (meth)acrylate (C) having a number average molecular weight of 500 to 10,000, which contains 20 to 80% by weight of an aromatic cyclic structural unit and/or an aliphatic cyclic structural unit and contains no active hydrogen atom, and an ethylenically unsaturated monomer (D), and (2) the second step of reacting the kneaded mixture obtained in the first step with the (meth)acrylate (b-1) and the polyisocyanate (b-2) at a temperature of room temperature to 80° C. until the resulting product has no flowability at an ordinary temperature, thereby causing chain elongation.

Kneading of the above-mentioned components in the first step can be carried out by using a mixing apparatus such as a kneader, stirrer, or mixer.

The kneading method includes, for example, a method of previously mixing the epoxy (meth)acrylate (b-1) having an aromatic cyclic structure and/or an aliphatic cyclic structure, the (meth)acrylate (C) having a number average molecular weight of 500 to 10,000, which contains 20 to 80% by weight of an aromatic cyclic structural unit and/or an aliphatic cyclic structural unit and contains no active hydrogen atom, and the ethylenically unsaturated monomer (D) in a mixing chamber, adding the polyisocyanate (b-2) immediately before feeding to the kneader, and kneading the mixture with the conductive filler (A) charged previously in the kneader with stirring.

Kneading may be carried out under normal pressure or reduced pressure. The kneading temperature is preferably from room temperature to 60° C.

To improve moldability or handling properties of the mixture, the kneaded mixture may be formed into a sheet, block or particles.

The epoxy (meth)acrylate (b-1) and the polyisocyanate (b-2) may be reacted to some extent by kneading as long as the resulting reaction product can be removed from the mixing apparatus.

The conductive resin composition of the present invention can be obtained by reacting the epoxy (meth)acrylate (b-1) with the polyisocyanate (b-2) while heating at a temperature within a range from room temperature to 80° C. until the resulting product has no flowability at an ordinary temperature after kneading, thereby causing chain elongation. The time required to this reaction varies depending on the resin composition and temperature conditions and is from about 5 to 100 hours.

After the completion of the second step, the conductive resin composition of the present invention has good moldability and handling properties for a long period of time. This effect is exerted by coexistence of adequately elongated urethane-modified epoxy (meth)acrylate (B) and (meth)acrylate (C) having a controlled molecular weight.

A molded article can be obtained by molding the conductive resin composition of the present invention in accordance with a molding method such as compression molding or injection molding method using a mold. The molding temperature is preferably from about 100 to 200° C. When using a radical polymerization initiator, it is preferable to control the temperature within an optimum temperature range of the radical polymerization initiator. The molding pressure is controlled to optimum pressure according to the mold, shape of the molded article, and use. The pressure is generally from about 5 to 20 MPa. If necessary, post-curing can be carried out under a heating atmosphere for the purpose of acceleration of curing or correction after molding.

The heat resistance of the molded article can be evaluated by measuring a heat deformation temperature by the procedure defined in JIS-K-7207 (Edgewise method of ISO-75). The heat deformation temperature of the molded article is a value as determined under measuring conditions of a load of 181.3 N/cm$^2$ and is preferably 150° C. or higher, and particularly preferably 200° C. or higher. When the molded article is used as a separator for a fuel cell, the higher the heat resistance, the better, because of low probability of the occurrence of heat deformation after mounting.

The molded article thus obtained can be used as various electrical and electronic materials, industrial members, and cell members such as a separator for a fuel cell.

The conductive resin composition of the present invention can be preferably used as a separator for a fuel cell because grooves as a gas passage can be molded with high accuracy using conventional molding methods for a common resin without requiring processing such as cutting.

The separator for a fuel cell of the present invention can be obtained in a simpler manner by molding in accordance with a molding method such as compression molding, transfer molding, injection molding method using a desired separator-shaped mold. The molding temperature can be appropriately selected, but is preferably within a range from 140 to 190° C. in view of productivity.

The separator for a fuel cell of the present invention is preferably used for a fuel cell wherein the operation temperature in generation is 200° C. or lower.

The separator for a fuel cell of the present invention can be used as a separator for various hydrazine type, direct methanol type, alkali type, solid polymer type, and phosphate type fuel cells. The separator is particularly suited for a solid polymer type fuel cell among these fuel cells.

EXAMPLES

The present invention will now be described in detail by way of examples and comparative examples. In the following examples, parts and percentages are by weight unless otherwise specified.

The measuring procedure and evaluation criteria used in the present invention will now be described.

[Evaluation of Handling Properties of Conductive Resin Composition]

In the case of removing the conductive resin compositions obtained in the examples and comparative examples described hereinafter from a multi-layer film for storage, removability from the film and the degree of stickiness of the surface of each resin composition were visually observed. The results were evaluated by the following two-rank criteria.

Poor: poor removability from the film, severe stickiness of the surface of the resin composition Good: good removability from the film, no stickiness of the surface of the resin composition

[Evaluation of Flowability of Conductive Resin Composition on Molding]

Using a 50 t transfer molding machine, each of the conductive resin compositions obtained in the examples and comparative examples described hereinafter was molded under the conditions of a pressure of 150 kgf/cm$^2$ (gauge pressure), a piston speed of 1 mm/sec and a temperature of 150° C. The resulting molded article has a cross section measuring 7×2 mm. A spiral flow length of the cured article was measured and the results were evaluated by the following four-rank criteria.

1: 0 cm or more and less than 20 cm
2: 20 cm or more and less than 40 cm
3: 40 cm or more and less than 80 cm
4: 80 cm or more To obtain good molding filling properties and molded articles which were packed closely, the spiral flow length is preferably 40 cm or more and less than 80 cm (rank 3). When the spiral flow length is less than 20 cm (rank 1), filling properties are poor. When the spiral flow length is 80 cm or more (rank 4), a molded article, which is closely packed in the mold, may not be obtained.

[Evaluation of Appearance of Molded Article]

Using the separators for a fuel cell obtained in the examples and comparative examples described hereinafter as test samples, filling properties, warp, cracking, swelling and internal state of each test sample were visually observed. Filling properties were evaluated by the following criteria: test samples where the resin composition is uniformly filled into the end portion were rated "good", and test samples where the resin composition is not filled or the thickness is not uniform were rated "poor". Warp, cracking and swelling were evaluated by the following criteria: test sample where warp, cracking or swelling was not observed was rated "none", test sample where warp, cracking or swelling was slightly observed was rated "observed". The internal state was evaluated by the following criteria: test samples where the cross section has a dense state were rated "good", and test samples where the cross section including numerous voids were rated "poor".

[Measurement of Conductivity of Molded Article]

Each of the plate-shaped molded articles obtained in the examples and comparative examples described hereinafter was cut to obtain test samples having a width of 1 cm, a thickness of 3 mm and a length of 10 cm. Using the resulting test samples, volume resistivity was measured in accordance with the procedure defined in JIS C-2525.

[Measurement of Flexural Strength of Molded Article]

Each of the plate-shaped molded articles obtained in the examples and comparative examples described hereinafter was cut to obtain test samples having a predetermined size. Using the resulting test samples, flexural strength was measured in accordance with the procedure defined in JIS K-6911. The measuring temperature was 25° C.

[Measurement of Heat Deformation Temperature of Molded Article]

Each of the plate-shaped molded articles obtained in the examples and comparative examples described hereinafter was cut to obtain test samples having a predetermined size. Using the resulting test samples, a heat deformation temperature was measured in accordance with the procedure A defined in JIS K-7207. The load was 181.3 N/cm$^2$.

[Evaluation of Hot Water Resistance of Molded Article]

Each of the plate-shaped molded articles obtained in the examples and comparative examples described hereinafter was cut to obtain test samples having a predetermined size. After dipping the resulting test samples in hot water at 95° C. acidified (pH 1) with sulfuric acid for 4,000 hours, flexural strength was measured in accordance with the procedure defined in JIS K-6911. Retention (%) relative to the strength before dipping was calculated and the results were evaluated by the following three-rank criteria. The measuring temperature was 25° C.

1: 0% or more and less than 50%
2: 50% or more and less than 80%
3: 80% or more and 110% or less Synthesis Example 1

Preparation of epoxy methacrylate B-1

In a 2 L four-necked flask equipped with a tube for introducing nitrogen and air, 490 g of EPICLON® 860 [bisphenol A type epoxy resin having an epoxy equivalent of 245, manufactured by DAINIPPON INK AND CHEMICALS, INCORPORATED], 170 g of methacrylic acid and 0.3 g of hydroquinone were charged and then heated to 90° C. under gas flow of a gas mixture of nitrogen and air in a ratio of 1:1. To this was added 1.0 g of 2-methylimidazole and the mixture was reacted for 8 hours while heating to 110° C. As a result, an acid value became 5 or less, and therefore the reaction was terminated. After cooling to about 80° C., the reaction product was removed from the reaction vessel to obtain an epoxy methacrylate. Hereinafter, the resulting epoxy methacrylate is referred to as an epoxy methacrylate B-1. The epoxy methacrylate B-1 had a hydroxyl value of 166 and contained 39% of an aromatic cyclic structural unit.

Synthesis Example 2

Preparation of epoxy methacrylate B-2

In a 2 L four-necked flask equipped with a tube for introducing nitrogen and air, 520 g of EPICLON® HP-7200 [dicyclopentadiene phenol novolac type epoxy resin having an epoxy equivalent of 260, manufactured by DAINIPPON INK AND CHEMICALS, INCORPORATED], 168 g of methacrylic acid and 0.3 g of hydroquinone were charged and then heated to 90° C. under gas flow of a gas mixture of nitrogen and air in a ratio of 1:1. To this was added 1.0 g of 2-methylimidazole and the mixture was reacted for 10 hours while heating to 110° C. As a result, an acid value became 6 or less, and therefore the reaction was terminated. After cooling to about 80° C., the reaction product was removed from the reaction vessel to obtain an epoxy methacrylate. Hereinafter, the resulting epoxy methacrylate is referred to as an epoxy methacrylate B-2. The epoxy methacrylate B-2 had a hydroxyl value of 160 and contained 55% of an aromatic cyclic structural unit.

Synthesis Example 3

Preparation of epoxy methacrylate B-3

In a 2 L four-necked flask equipped with a tube for introducing nitrogen and air, 548 g of NC-3000 [biphenyl group-containing phenol novolac type epoxy resin having an epoxy equivalent of 274, manufactured by NIPPON KAYAKU CO., LTD.], 168 g of methacrylic acid and 0.3 g of hydroquinone were charged and then heated to 90° C. under gas flow of a gas mixture of nitrogen and air in a ratio of 1:1. To this was added 1.0 g of 2-methylimidazole and the mixture was reacted for 9 hours while heating to 110° C. As a result, an acid value became 6 or less, and therefore the reaction was terminated. After cooling to about 80° C., the reaction product was removed from the reaction vessel to obtain an epoxy methacrylate. Hereinafter, the resulting epoxy methacrylate is referred to as an epoxy methacrylate B-3. The epoxy methacrylate B-3 had a hydroxyl value of 153 and contained 51% of an aromatic cyclic structural unit.

Synthesis Example 4

Preparation of urethane methacrylate C-1

In the same flask as in Synthesis Example 1, 360 g of BAP-2 [propylene oxide (2 mol) adduct of bisphenol A having a hydroxyl group equivalent of 180, manufactured by Nippon Nyukazai Co., Ltd.] and 444 g of isophorone diisocyanate were charged and then reacted at 80° C. for 4 hours under a gas flow of a gas mixture of nitrogen and air in a ratio of 1:1. To this were added 270 g of 2-hydroxyethyl methacrylate, 0.15 g of hydroquinone and 0.11 g of tin octanate at 60° C. and the mixture was reacted for 6 hours while heating to 90° C. to obtain a urethane methacrylate. Hereinafter, the resulting urethane methacrylate is referred to as an epoxy methacrylate C-1. The urethane methacrylate C-1 had a hydroxyl value of 4 and a number average molecular weight of 910. Furthermore, it contained 30% of an aromatic cyclic structural unit.

Components used in the examples and Comparative Examples described hereinafter, except for the resins obtained in Synthesis Examples 1 to 4, are listed below.

K-100 [synthesis graphite having a mean particle size of 300 μm, manufactured by Applied Carbon Technology]: hereinafter referred to as filler A-1

Methacrylate of propylene oxide (2 mol) adduct of bisphenol A (manufactured by Nippon Nyukazai Co., Ltd.): hereinafter referred to as methacrylate C-2. This methacrylate C-2 had a hydroxyl value of 8 and a number average molecular weight of 510. Furthermore, the content of an aromatic cyclic structural unit in the molecule was 31%.

DVB-96 [divinylbenzene having a purity of 96%, manufactured by Nippon Steel Chemical Co., Ltd.]: hereinafter referred to as monomer D-1

ISONATE 143LJ [modified liquid compound of diphenylmethane diisocyanate, NCO: 29%, manufactured by Dow Polyurethane Japan Ltd.]: hereinafter referred to as polyisocyanate E-1

Dic Styrene CR-2500 [polystyrene resin having a molecular weight of 200,000, manufactured by DAINIPPON INK AND CHEMICALS, INCORPORATED]: hereinafter referred to as low profile additive-1

BIC-75 [organic peroxide, 10 hours half life: 97° C., manufactured by Kayaku Akzo Corporation]: hereinafter referred to as initiator-1 p-benzoquinone (manufactured by Eastman Chemical Co., Ltd.): hereinafter referred to as inhibitor-1

Carnauba wax (manufactured by S. Kato & Co): hereinafter referred to as releasant-1

RS-900 [containing a graft copolymer of polystyrene and polyethylene oxide, manufactured by DAINIPPON INK AND CHEMICALS, INCORPORATED]: hereinafter referred to as compatibilizing-agent-1

Examples 1 to 5

Preparation of Conductive Resin Composition and Molded Article

According to the formulation shown in Table 1, the epoxy methacrylates B-1, B-2 and B-3 prepared in Synthesis Examples 1 to 4, the methacrylate C-1, the methacrylate C-2 and the above-mentioned components were mixed at room temperature using a kneader to obtain conductive resin compositions. Each of the resulting conductive resin compositions was securely packed with a styrene impermeable multi-layer film. The conductive resin composition was reacted at 30° C. for 2 days, allowed to stand at room temperature and stored. In the case of removing the conductive resin composition from the multi-layer film after 3 days had passed since the preparation, handling properties of the resin composition were evaluated. After 3 and 15 days passed since the preparation of the resin composition, flowability on molding was evaluated.

The resin composition removed from the multi-layer film after 3 days had passed since the preparation was uniformly filled into a separator-shaped mold and a plate-shaped mold and then molded by a compression molding machine under the conditions of a pressure of 140 kgf/cm$^2$ (gauge pressure), a upper mold temperature of 150° C., a lower mold temperature of 145° C. and a molding time of 10 minutes to obtain a separator for a fuel cell and a plate-shaped molded article, each having a width of 13 cm, a length of 20 cm, and a thickness of 3 mm.

With regard to the separator for a fuel cell, appearance was evaluated. With regard to the plate-shaped molded article, conductivity, flexural strength, heat deformation temperature and hot water resistance were evaluated. The evaluation results are shown in Table 3.

Comparative Examples 1 to 3

In the same manner as in Examples 1 to 3, except that the urethane methacrylate and methacrylate used in Examples 1 to 3 were not used, conductive resin compositions and molded articles were obtained. In this case, the amount of the entire resin component was adjusted so as to make the amount of the conductive filler in the resin composition be the same. The amount is shown in Table 2. The evaluation results are shown in Table 4.

Comparative Example 4

In the same manner as in Comparative Example 2, except that a conductive resin composition was prepared without using any polyisocyanate in Comparative Example 2, a conductive resin composition and a molded article were obtained. In this case, the amount of the entire resin component was adjusted so as to make the amount of the conductive filler in the resin composition be the same. The amount is shown in Table 2. The evaluation results are shown in Table 4.

TABLE 1

| | | Examples | | | | | |
|---|---|---|---|---|---|---|---|
| | Item | 1 | 2 | 3 | 4 | 5 | 6 |
| Mixing ratio (%) | Epoxy methacrylate (B) | | | | | | |
| | B-1 | 80 | | | 70 | | 30 |
| | B-2 | | 75 | | | | |
| | B-3 | | | 75 | | 70 | 50 |
| | Urethane methacrylate (C) C-1 | 20 | 25 | 25 | 30 | 30 | |
| | Methacrylate (C) C-2 | | | | | | 20 |
| Amount (Parts) | Filler A-1 | 70 | 70 | 70 | 70 | 75 | 80 |
| | (B) + (C) | 15.0 | 15.2 | 15.3 | 15.2 | 12.8 | 10.0 |
| | Monomer D-1 | 3.3 | 3.4 | 3.4 | 3.2 | 2.9 | 2.3 |
| | Styrene monomer | 6.6 | 6.7 | 6.7 | 6.0 | 5.0 | 4.1 |
| | Polyisocyanate E-1 | 5.1 | 4.7 | 4.6 | 4.6 | 3.8 | 3.1 |
| | Low profile additive-1 | 0 | 0 | 0 | 1.0 | 0.5 | 0.5 |
| | Initiator-1 | 0.2 | 0.2 | 0.2 | 0.2 | 0.2 | 0.2 |
| | Inhibitor-1 | 0.01 | 0.01 | 0.01 | 0.01 | 0.01 | 0.01 |
| | Releasant-1 | 0.5 | 0.5 | 0.5 | 0.5 | 0.5 | 0.5 |
| | Compatibilizing-agent-1 | 0 | 0 | 0 | 0.1 | 0.1 | 0.1 |
| | Ratio OH/NCO* | 1.0/1.0 | 1.0/1.0 | 1.0/1.0 | 1.0/1.0 | 1.0/1.05 | 1.0/0.94 |

*Ratio of the total mol number of a hydroxyl group of an epoxy methacrylate (B), a urethane methacrylate (C) and a methacrylate (C) to the mol number of isocyanate group of a polyisocyanate E-1 (mol number of hydroxyl group/mol number of isocyanate group)

TABLE 2

|  | | Comparative Examples | | | |
|---|---|---|---|---|---|
| Item | | 1 | 2 | 3 | 4 |
| Mixing ratio (%) | Epoxy methacrylate (B) | | | | |
| | B-1 | 100 | | | |
| | B-2 | | 100 | | 100 |
| | B-3 | | | 100 | |
| | Urethane methacrylate (C) C-1 | | | | |
| | Methacrylate (C) C-2 | | | | |
| Amount (Parts) | Filler A-1 | 70 | 70 | 70 | 70 |
| | (B) | 14.7 | 15.0 | 15.1 | 18.0 |
| | Monomer D-1 | 3.3 | 3.3 | 3.4 | 4.0 |
| | Styrene monomer | 6.5 | 6.6 | 6.7 | 8.0 |
| | Polyisocyanate E-1 | 5.5 | 5.1 | 4.8 | 0 |
| | Low profile additive-1 | 0 | 0 | 0 | 0 |
| | Initiator-1 | 0.2 | 0.2 | 0.2 | 0.2 |
| | Inhibitor-1 | 0.01 | 0.01 | 0.01 | 0.01 |
| | Releasant-1 | 0.5 | 0.5 | 0.5 | 0.5 |
| | Compatibilizing-agent-1 | 0 | 0 | 0 | 0 |
| | Ratio OH/NCO** | 1.0/0.89 | 1.0/0.83 | 1.0/0.8 | 1.0/0 |

**the same as in Table 1

TABLE 3

| | Examples | | | | | |
|---|---|---|---|---|---|---|
| Item | 1 | 2 | 3 | 4 | 5 | 6 |
| Handling properties Flowability on molding | good | good | good | good | good | good |
| 3 days after production | 3 | 3 | 3 | 3 | 3 | 3 |
| 15 days after production | 3 | 3 | 3 | 3 | 3 | 3 |
| Appearance of molded article | | | | | | |
| Filling properties | good | good | good | good | good | good |
| Warp | none | none | none | none | none | none |
| Cracking | none | none | none | none | none | none |
| Internal state | good | good | good | good | good | good |
| Conductivity | | | | | | |
| Volume resistivity (mΩ · cm) | 10 | 12 | 11 | 9 | 6 | 4 |
| Flexural strength (MPa) | 41 | 38 | 39 | 43 | 40 | 41 |
| Heat distortion temperature (° C.) | 217 | 276 | 293 | 210 | 282 | 285 |
| Hot water resistance | 3 | 3 | 3 | 3 | 3 | 3 |

TABLE 4

| | Comparative Examples | | | |
|---|---|---|---|---|
| Item | 1 | 2 | 3 | 4 |
| Handling properties Flowability on molding | good | good | good | poor |
| 3 days after production | 2 | 1 | 1 | 4 |
| 15 days after production | 1 | 1 | 1 | 4 |
| Appearance of molded article | | | | |
| Filling properties | poor | poor | poor | good |
| Warp | observed | observed | observed | none |

TABLE 4-continued

| | Comparative Examples | | | |
|---|---|---|---|---|
| Item | 1 | 2 | 3 | 4 |
| Cracking | none | observed | observed | none |
| Internal state | good | good | good | lot of voids |
| Conductivity | | | | |
| Volume resistivity (mΩ · cm) | 26 | 31 | 29 | 12 |
| Flexural strength (MPa) | 31 | 28 | 32 | 22 |
| Heat distortion temperature (° C.) | 235 | 286 | 300 | 181 |
| Hot water resistance | 2 | 2 | 2 | 1 |

As is apparent from the results described in Table 3 and Table 4, in Examples 1 to 6, molded articles having high quality were obtained because of excellent moldability and thus materials suited for use as a separator for a fuel cell can be provided. As is apparent from the results described in Table 4, in Comparative Examples 1 to 4, the resulting molded articles had large defects because of poor moldability, and thus the molded articles are not suited for practical use.

INDUSTRIAL APPLICABILITY

The conductive resin composition of the present invention is excellent in handling properties and does not cause problems with regard to moldability such as occurrence of separation between a resin component and a conductive filler, voids and warp on molding, and is also excellent in filling into a mold and can provide a molded article having excellent dimensional accuracy.

The molded article obtained by curing the conductive resin composition of the present invention is excellent in conductivity, heat resistance and mechanical strength, particularly durability such as hydrolysis resistance. Therefore, the molded article obtained by curing the conductive resin composition of the present invention is also very useful as a separator for a fuel cell which is used under severe environmental conditions. The use of the conductive resin composition of the present invention makes it possible to produce the above-mentioned separator for a fuel cell having excellent properties in an economic and stable manner through a simple process.

Furthermore, the use of the separator for a fuel cell of the present invention makes it possible to provide a fuel cell having high performances and high durability.

The invention claimed is:

1. A conductive resin composition comprising:
   a conductive filler (A);
   a urethane-modified epoxy (meth)acrylate (B) obtained by reacting an epoxy (meth)acrylate (b-1) with a polyisocyanate (b-2); the epoxy (meth)acrylate (b-1) being obtained by an addition reaction of an epoxy resin having an aromatic cyclic structural unit and/or an aliphatic cyclic structural unit and a (meth)acrylic acid; the epoxy (meth)acrylate (b-1) having a hydroxyl value in the range of 100 to 300; the molar ratio of moles of hydroxyl group of the epoxy (meth) acrylate (b-1) to moles of isocyanate group of the polyisocyanate (b-2) being within the range of 1.0/ (0.5 to 1.5);
   a (meth)acrylate (C) having a number average molecular weight of 500 to 10,000, which contains 20 to 80% by weight of an aromatic cyclic structural unit and/or an aliphatic cyclic structural unit, and contains no active hydrogen atom; the (meth)acrylate (C) is a reaction product obtained by reacting a polyetherpolyol having an aromatic cyclic structural unit and/or an aliphatic cyclic structural unit with a (meth)acrylic acid; and the other ethylenically unsaturated monomer (D) which is copolymerizable with the urethane-modified epoxy (meth)acrylate (B) and the (meth)acrylate (C)

wherein a weight ratio of the urethane-modified epoxy (meth)acrylate (B) to the (meth)acrylate (C) is from 95/5 to 50/50.

2. A conductive resin composition according to claim 1, wherein the epoxy resin contains 30 to 90% by weight of an aromatic cyclic structural unit and/or an aliphatic cyclic structural unit.

3. A conductive resin composition according to claim 1, wherein the epoxy resin is a novolac type epoxy resin.

4. A conductive resin composition according to claim 1, wherein the polyetherpolyol having an aromatic cyclic structural unit and/or an aliphatic cyclic structural unit is an alkylene oxide adduct of a multinucleate phenolic compound.

5. A conductive resin composition according to claim 1, wherein the content of the conductive filler (A) is from 50 to 90% by weight.

6. A conductive resin composition according to claim 1, wherein the content of the conductive filler (A) is from 50 to 90% by weight, the content of the urethane-modified epoxy (meth)acrylate (B) is from 6 to 18% by weight, the content of the (meth)acrylate (C) is from 2 to 8% by weight, the content of the other ethylenically unsaturated monomer (D) is from 2 to 25% by weight, and the total percentage of (A), (B), (C), and (D) is 100%.

7. A conductive resin composition according to claim 1, wherein the ethylenically unsaturated monomer (D) is an aromatic vinyl monomer.

8. A method for producing a conductive resin composition, which comprises:

(1) the first step of kneading a conductive filler (A), an epoxy (meth)acrylate (b-1) obtained by the addition reaction of an epoxy resin having an aromatic cyclic structural unit and/or an aliphatic cyclic structural unit and a (meth)acrylic acid, a polyisocyanate (b-2), a (meth)acrylate (C), a reaction product obtained by reacting a polyetherpolyol having an aromatic cyclic structural unit and/or an aliphatic cyclic structural unit with a (meth)acrylic acid, having a number average molecular weight of 500 to 10,000, which contains 20 to 80% by weight of an aromatic cyclic structural unit and/or an aliphatic cyclic structural unit and contains no active hydrogen atom, and an ethylenically unsaturated monomer (D); and (2) the second step of reacting the kneaded mixture obtained in the first step with the (meth)acrylate (b-1) and the polyisocyanate (b-2) at a temperature of room temperature to 80° C., thereby causing chain elongation;

wherein the epoxy (meth)acrylate (b-1) has a hydroxyl value in the range of 100 to 300; and, the molar ratio of moles of hydroxyl group of the epoxy(meth)acrylate (b-1) to moles of isocyanate group of the polyisocyanate (b-2) is within the range of 1.0/(0.5 to 1.5).

9. A separator for a fuel cell obtained by molding the conductive resin composition according to claim 1.

10. A separator for a fuel cell obtained by molding the conductive resin composition according to claim 2.

11. A separator for a fuel cell obtained by molding the conductive resin composition according to claim 3.

12. A separator for a fuel cell obtained by molding the conductive resin composition according to claim 5.

13. A separator for a fuel cell obtained by molding the conductive resin composition according to claim 4.

14. A separator for a fuel cell obtained by molding the conductive resin composition according to claim 7.

15. A separator for a fuel cell obtained by molding the conductive resin composition according to claim 6.

* * * * *